Sept. 10, 1929.            J. F. LUCAS            1,727,438
COLLAPSIBLE RUMBLE SEAT CANOPY
Filed Aug. 15, 1928      3 Sheets-Sheet 1
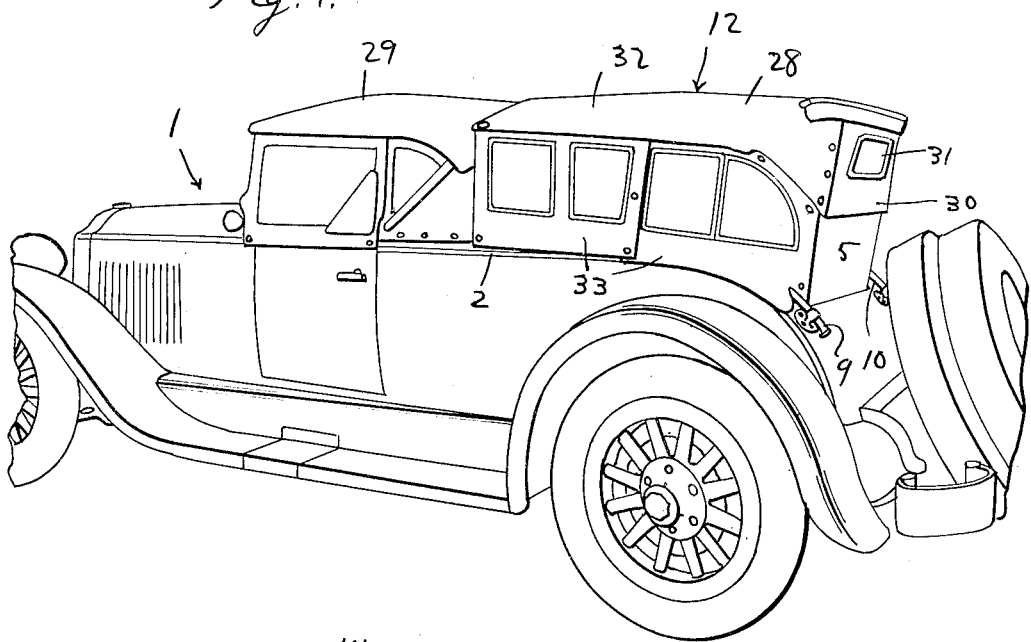
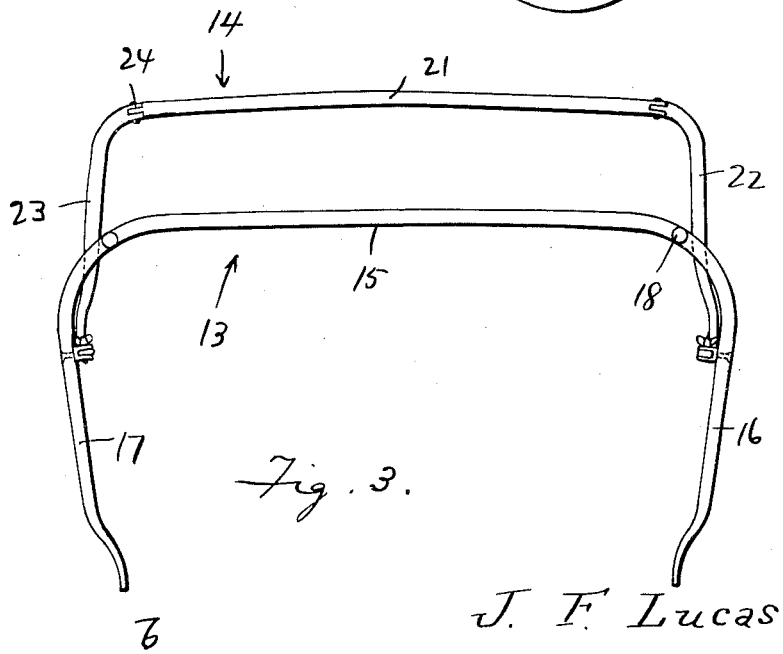
Inventor
J. F. Lucas
By Thomas A O'Brien
Attorney Sept. 10, 1929.  J. F. LUCAS  1,727,438
COLLAPSIBLE RUMBLE SEAT CANOPY
Filed Aug. 15, 1928   3 Sheets-Sheet 2
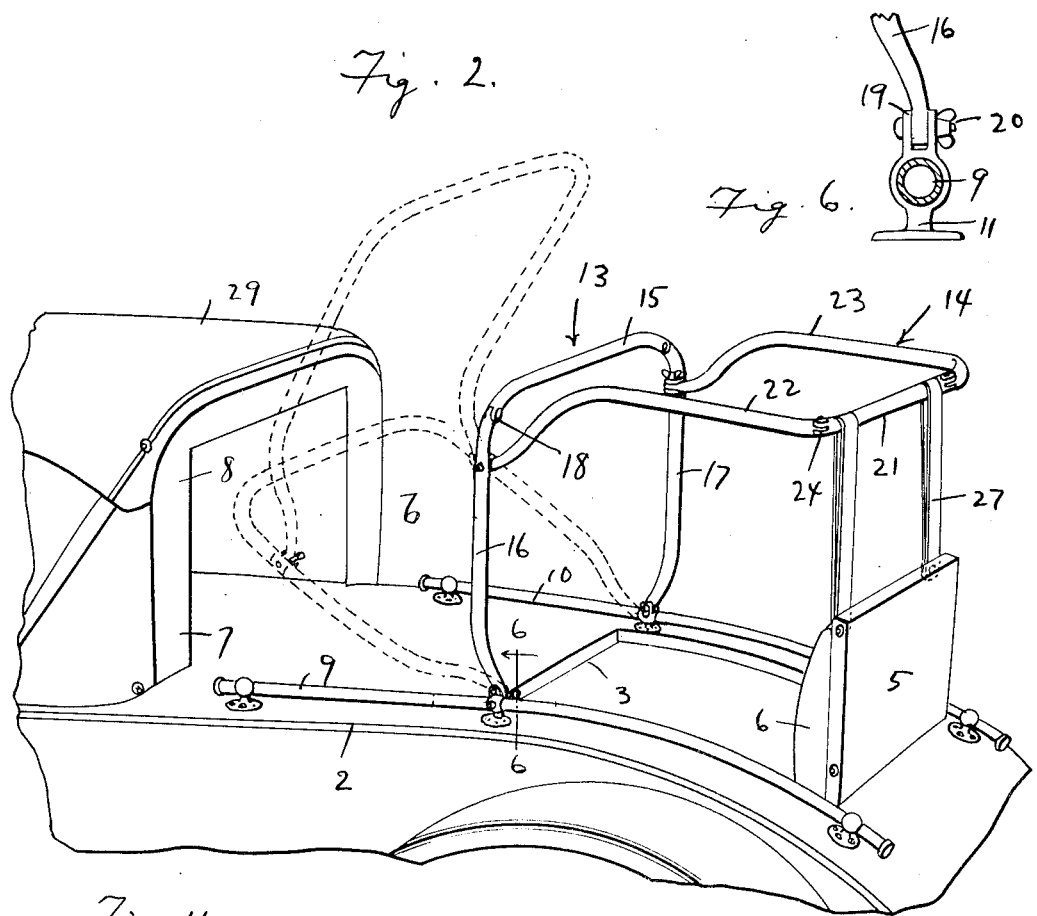
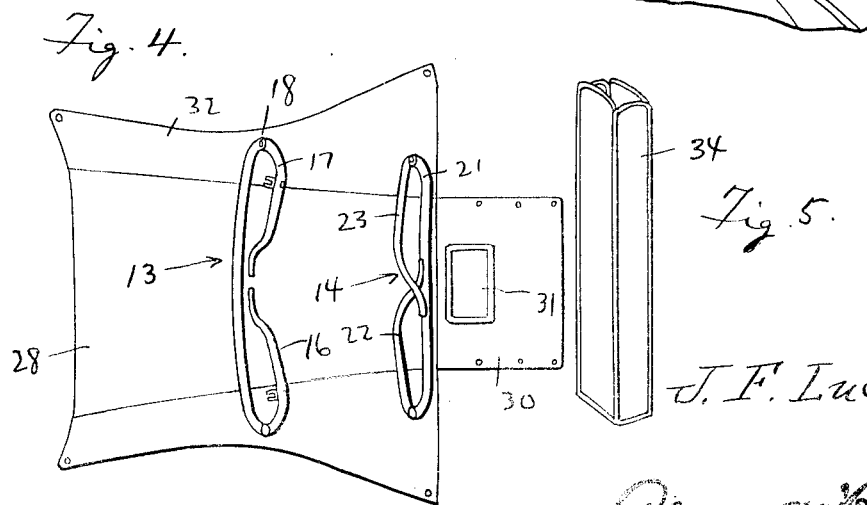

Sept. 10, 1929.　　　　J. F. LUCAS　　　　1,727,438
COLLAPSIBLE RUMBLE SEAT CANOPY
Filed Aug. 15, 1928　　　3 Sheets-Sheet 3
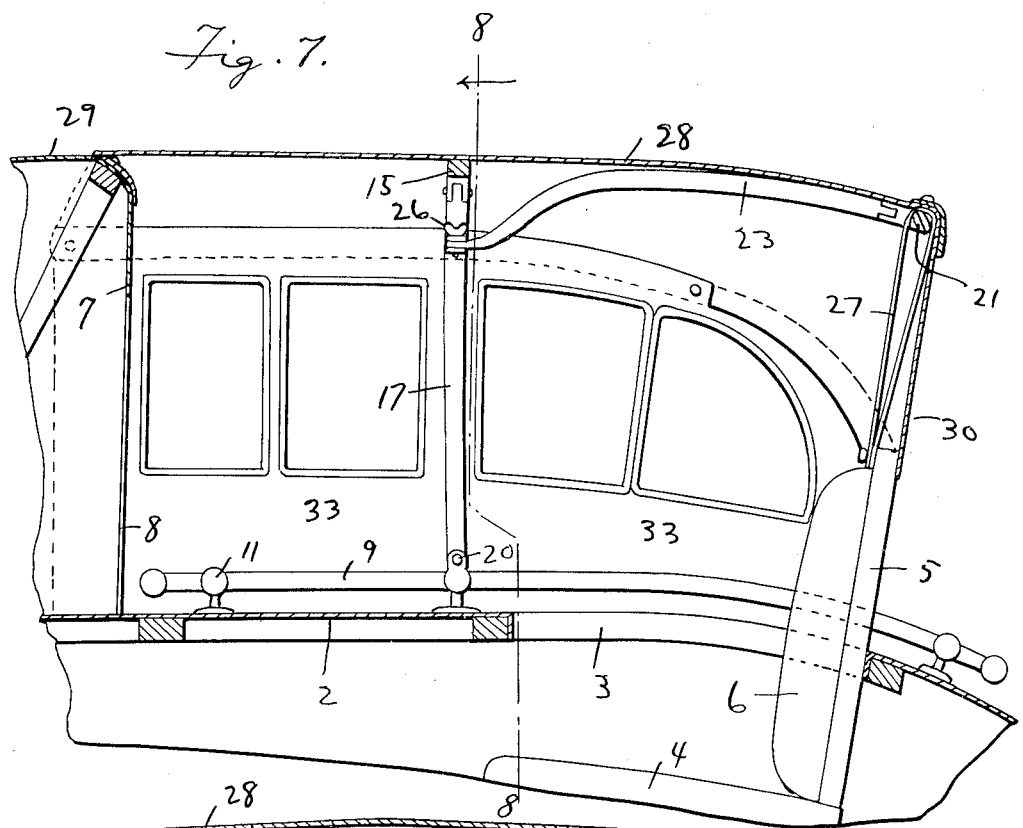
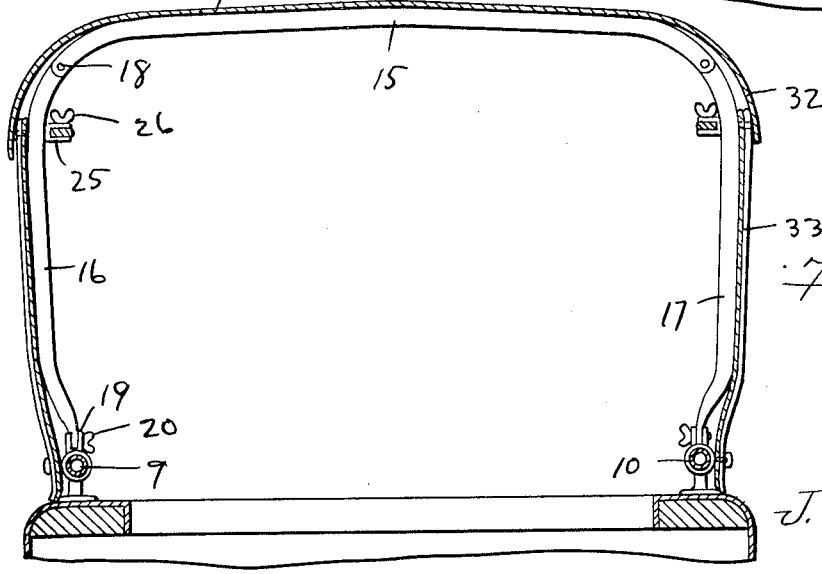
Inventor
J. F. Lucas
By Clarence A. O'Brien
Attorney Patented Sept. 10, 1929.

1,727,438

UNITED STATES PATENT OFFICE.

JOHN F. LUCAS, OF PIERCE CITY, MISSOURI.

COLLAPSIBLE RUMBLE-SEAT CANOPY.

Application filed August 15, 1928. Serial No. 299,757.

The present invention relates to improvements in automobile curtains and has reference more particularly to a collapsible and folding canopy for the rumble seat associated with the automobiles of the sport cabriolet or coupe types.

One of the important objects of the present invention is to provide a device for protecting the passengers of the rumble seat, against rain, and sun.

At the present time, automobiles equipped with rumble seats do not have any means for protecting the occupants of the rumble seat, and it is therefore the principal aim of the present invention to provide a structure that can be readily and easily attached or detached on the automobile for enclosing the rumble seat compartment whereby the occupants of the rumble seat will be properly protected.

A further object is to provide a collapsible and foldable rumble seat canopy which is of such construction as to permit occupants to leave and enter the rumble seat compartments without necessitating the entire removal of the canopy from the rear deck of the automobile body.

Still a further object is to provide a device of the above mentioned character which can be folded into small compass when not in use, so as to occupy a minimum amount of space, and whereby the same can be stored away either in the rear deck of the automobile, or wherever desired.

A further object is to provide a structure of the above mentioned character which is simple, inexpensive, strong and durable, and further well adapted to the purpose for which it is designed.

Other objects and advantages of the invention will become apparent as the nature of the invention proceeds and when taken in connection with the accompanying drawings.

In the accompanying drawings, forming a part of this application and wherein like reference characters designate like parts throughout the several views:

Figure 1 is a perspective view of an automobile, with rumble seat, showing my rumble seat canopy completely assembled and in use.

Figure 2 is an enlarged detail perspective view showing the frame construction of the device, and the manner in which the same is attached on the rear deck of the automobile, and also showing the connection between the rear end of the frame and the back rest of the rumble seat.

Figure 3 is a front end elevation of the frame construction.

Figure 4 is a detail top plan showing the frames detached and folded for disposition across the top curtain of the canopy when the canopy is not in use and the device is to be folded up.

Figure 5 is a detail perspective view of the waterproof casing for receiving the folded parts of the canopy.

Figure 6 is a sectional view, taken approximately on the line 6—6 of Figure 2, looking in the direction of the arrows.

Figure 7 is a longitudinal sectional view, through rumble seat compartment, showing the manner in which my canopy is disposed over the rumble seat compartment, and Figure 8 is a vertical sectional view, taken approximately on the line 8—8 of Figure 7, looking in the direction of the arrows.

In the drawings, wherein for the purpose of illustration is shown the preferred embodiment of my invention, the numeral 1 designates generally a roadster of any well known type, the same being provided with the rear deck 2. The rear deck is provided, in its top with an enlarged opening 3, in which space is located a rumble seat, 4.

A hinged cover 5 is provided for the opening 3, and this cover has its under side upholstered to provide a back rest 6 for the rumble seat, when the cover 5 is disposed in a vertical position in the manner as shown in Figure 7 of the drawings.

The back curtain 7 of the driver's seat compartment is provided with the usual opening 8 as shown in Figures 2 and 7 of the drawings.

A pair of longitudinally extending bars 9 and 10 respectively are secured on the rear deck 2 on opposite sides of the opening 3, in suitable supports shown at 11. Each of the bars conforms to the contour of the top of the rear deck 2 and as is clearly shown in the drawings, the forward ends of the bars terminate adjacent the rear curtain 7 of the driver's seat compartment, while the rear ends of the bars terminate rearwardly of the seat and the purpose of these bars will be presently described.

My collapsible and folding canopy for the rumble seat compartment is designated generally by the numeral 12, and the same includes a pair of substantially U-shaped frame units, denoted by the reference characters 13 and 14 respectively. The crown portion 15 of the U-shaped unit 13 is adapted to provide a bow for the top portion 16 of the canopy and the arms 17 and 18 of this particular U-shaped unit 13 are pivotally connected to the respective ends of the crown portion 15, as at 18, so that the arms may fold inwardly against the crown portion 15, as suggested in Figure 4.

The lower free ends of the arms are slightly offset and are detachably and pivotally secured in suitable yokes 19, provided therefor on the intermediate supports 11 provided for the respective longitudinal bars 9 and 10, the pivotal connection between the lower end of each arm of the inverted U-shaped unit 13 and the respective longitudinal bar being shown at 20 with reference more particularly to Figure 6.

The other U-shaped unit 14 is disposed substantially at right angles with respect to the inverted U-shaped unit 13 and the crown portion 21 of the horizontal U-shaped unit 14 has its ends hingedly connected to the rear ends of the arms 22 and 23 respectively, as at 24, so that said arms may also swing inwardly for disposition against the crown portion 21, as suggested in Figure 4, when the canopy frame structure is to be collapsed and folded, when not in use.

The forward ends of the arms 22 and 23 are disposed downwardly and thence forwardly and are detachably, yet fixedly secured to the arms 16 and 17 respectively of the U-shaped unit 13, in suitable brackets 25, carried by the arms 16 and 17, thumb screws 26 providing the means for securing the forward ends of the arms 22 and 23 to the vertically disposed arms 16 and 17 respectively, and this is clearly illustrated in Figures 3, 7 and 8 of the drawings.

A pair of straps 27 are looped over the crown portion 21 of the horizontally disposed U-shaped unit 14 and the ends of these straps are detachably secured to the upper edge portions of the hinged cover 5 for securing the frame of the canopy in a rigid position. When the straps are disengaged from the hinge cover 5, the frame may be swung as a unit, to the position shown in the dotted lines in Figure 2, whereby persons may enter or leave the rumble seat compartment, without necessitating the removal of the canopy from the rear deck of the automobile body.

The canopy further includes the provision of the top curtain 28, that extends over the crown portions 15 and 21 of the frames 13 and 14 respectively. The forward edge of the top curtain 28 is detachably secured to the rear portion of the top curtain 29 that covers the driver's seat compartment by suitable snap fasteners or the like. The rear free end portion 30 of the top curtain 28 is adapted to be disposed downwardly and is detachably secured, at its lower corners to the hinged cover 5 when the latter is disposed vertically. The rear end portion 30 is provided with a transparency 31 so that the driver of the automobile can observe pursuing vehicles when the canopy is in use over the rumble seat compartment.

The top curtain 28 is formed along its side edges with depending extensions 32. Side curtains 33 cover the space between the rear deck and the top curtain 28, and also the space between the back curtain 7 of the driver's seat compartment and the hinged cover 5 of the rumble seat as clearly shown in Figure 1.

When the parts are arranged as shown in Figure 1, as well as in Figure 7, the occupants of the rumble seat 4 will be completely protected from the sun or rain and snow, and the vision of the drivers of the vehicles in the rear will not be obstructed by reason of the transparency 31, in the rear curtain 30.

When the rumble seat is not in use, the straps 27 are removed and the frame is detached from the bars after which the U-shaped units are disconnected and are folded in the manner as shown in Figure 4, across the top curtain, and the side curtains are also adapted to be wrapped up with the top curtain and the U-shaped units of the frame structure, after which the folded elements are placed in the water-proof container 4 shown in Figure 5, so that a compact article will be provided, that can be stored away in the rear deck of the automobile, or in any other desirable place, without occupying much space.

The provision of a collapsible and folding canopy structure of the above mentioned character will enable the parts to be readily and easily assembled or disassembled, and furthermore can be attached on an automobile body provided with a rumble seat, without necessitating any alteration of the parts of the automobile body.

Furthermore, a structure of the above mentioned character will at all times, be positive and efficient in carrying out the purposes for which it is designed and by simply disengaging the straps 27 and the rear curtain 30 from the hinged cover 5, the canopy structure can be slightly swung forwardly whereby to permit the occupant to enter or leave the rumble seat while the canopy is attached to the rear deck.

While I have shown the preferred embodiment of my invention, it is to be understood that various changes in the size, shape and arrangement of parts may be resorted to, without departing from the spirit of the invention or the scope of the appended claims.

What I claim as new is:

1. A top supporting frame for vehicles comprising a normally vertically disposed frame member, a horizontally disposed frame member rigidly secured adjacent the upper portion of said vertical frame member for movement therewith as a unit, a pair of spaced parallel bars attachable to the vehicle, attaching brackets for the bars adapted to be secured to the vehicle and adjustable longitudinally of said bars when said brackets are unsecured, and means carried by the brackets for pivotally attaching said vertical frame member thereto.

2. A top supporting frame for vehicles comprising a normally vertically disposed frame member, a horizontally disposed frame member rigidly secured adjacent the upper portion of said frame member for movement therewith as a unit, a pair of spaced parallel bars, vehicle attaching brackets for each of the bars adapted for positioning at any point intermediate the ends of the bars, a pair of spaced apertured extensions formed on the brackets for receiving the lower ends of said vertical frame member and a pivot member inserted through the apertures of said extensions and said lower ends of the vertical frame member for pivotally attaching said member to the extensions.

3. In combination, a vehicle having a deck portion provided with a rumble seat, a canopy frame for the seat including a pair of U-shaped frame members, one of said frame members being invertedly disposed and normally vertically positioned and the other of said frame members being normally horizontally disposed above the seat with its ends rigidly and detachably secured adjacent the upper portion of said vertical frame member for movement therewith as a unit and attaching means for said vertical frame member comprising a pair of spaced parallel bars disposed at opposite sides of the seat and secured at each end to said deck and in spaced relation therefrom, a pair of deck attaching brackets having openings for receiving said bars whereby to position the brackets at any predetermined point longitudinally of the bars and a pair of spaced parallel extensions formed on said brackets for receiving the lower ends of said vertical frame members, said ends of said members and said extensions having alined openings therein and a pivot member inserted through said openings forming a pivotal mounting for said vertical frame member for swinging movement forwardly or rearwardly of said seat.

In testimony whereof I affix my signature.

JOHN F. LUCAS.